United States Patent
Hsiao (10) Patent No.: US 9,927,567 B2
(45) Date of Patent: Mar. 27, 2018

(54) DISPLAY WITH ADDITIONAL LIGHTING EFFECTS

(71) Applicant: Young Lighting Technology Inc., Hsin-Chu (TW)

(72) Inventor: Chun-Chung Hsiao, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 222 days.

(21) Appl. No.: 14/810,494

(22) Filed: Jul. 28, 2015

(65) Prior Publication Data

US 2016/0066441 A1 Mar. 3, 2016

(30) Foreign Application Priority Data

Aug. 26, 2014 (TW) .............................. 103129349 A (51) Int. Cl.
*F21V 7/04* (2006.01)
*F21V 8/00* (2006.01)
*H04M 1/22* (2006.01)
*H04M 1/02* (2006.01)
(Continued)

(52) U.S. Cl.
CPC ......... *G02B 6/0025* (2013.01); *G02B 6/0066* (2013.01); *H04M 1/22* (2013.01); *G02F 1/133615* (2013.01); *G02F 2001/133322* (2013.01); *G02F 2001/133331* (2013.01); *G02F 2001/133342* (2013.01); *G02F 2001/133388* (2013.01); *H04M 1/0266* (2013.01)

(58) Field of Classification Search
None
See application file for complete search history.

(56) References Cited

U.S. PATENT DOCUMENTS 8,767,144 B2 7/2014 Wu et al.
2011/0292322 A1* 12/2011 Wu .................... G02F 1/133608
349/65
2012/0329526 A1 12/2012 Song et al.
(Continued)

FOREIGN PATENT DOCUMENTS

CN 203135988 8/2013
TW M261932 4/2005
(Continued)

OTHER PUBLICATIONS

"Office Action of Taiwan Counterpart Application," dated Aug. 14, 2015, p. 1-p. 3.

*Primary Examiner* — Andrew Coughlin
(74) *Attorney, Agent, or Firm* — JCIPRNET (57) ABSTRACT

A display includes a casing, a display panel, a backlight module, a front panel and a cover. The casing has a containing space. The display panel is disposed in the containing space. The backlight module is disposed in the containing space and includes a light guide plate and a light source. The light source is adapted to provide a first light beam and a second light beam. The first light beam enters the light guide plate and is illuminated toward the display panel after being transmitted in the light guide plate. The front panel covers the containing space and has a light penetration region. The cover wraps the light source and has at least a slot. The second light beam passes through the slot to be transmitted toward the light penetration region, and is illuminated out of the containing space from the light penetration region.

12 Claims, 6 Drawing Sheets

(51) Int. Cl.
    *G02F 1/1335*     (2006.01)
    *G02F 1/1333*     (2006.01)

(56) References Cited

U.S. PATENT DOCUMENTS

| | | |
|---|---|---|
| 2013/0106813 A1 | 5/2013 | Hotelling et al. |
| 2013/0222736 A1* | 8/2013 | Qi .................. G06F 1/1601 349/65 |
| 2015/0177548 A1* | 6/2015 | Jeon .................. G02F 1/133308 349/12 |

FOREIGN PATENT DOCUMENTS

| | | |
|---|---|---|
| TW | M442662 | 12/2012 |
| TW | 201323994 | 6/2013 |
| TW | I402578 | 7/2013 |
| TW | I406055 | 8/2013 |
| TW | I422926 | 1/2014 |

* cited by examiner

DISPLAY WITH ADDITIONAL LIGHTING EFFECTS

CROSS-REFERENCE TO RELATED APPLICATION

This application claims the priority benefit of Taiwan application serial no. 103129349, filed on Aug. 26, 2014. The entirety of the above-mentioned patent application is hereby incorporated by reference herein and made a part of this specification.

BACKGROUND OF THE INVENTION

Field of the Invention

The invention relates to a display device, and particularly relates to a display device having a backlight module.

Description of Related Art

Smart phones, notebooks and digital displays are developing with convenience of use, multi functions, and aesthetically appearance. When using these products, a display screen is an indispensable interface, and liquid crystal displays (LCD) have become the main stream for display screens. Because the LCD panel does not emit light inherently, a backlight module is arranged under the LCD panel to provide the light necessary for displaying image.

As for smart phones and other types of mobile devices, in order to satisfy consumer demand, some mobile devices have additionally equipped light emitting components other than the existing backlight module, to provide the light needed for call alerts, exterior decorations, scene exhibition, virtual keys or other types of additional lighting effects. However, adding the additional light emitting component in a mobile device increases the manufacturing cost and consumes power, and thus poses a disadvantage for the light, thin, and narrow border designs of a mobile device.

Taiwan patent number TWI402578 discloses a display device, where a light beam emitted by a light source of a backlight module passes through a light guide plate, an imaging unit and a scene light guide unit to be emitted out, for providing a scene light. Taiwan patent publication number TW201323994 discloses a hand held electronic device, where a backlight module extends outside of a display panel to provide light beam to a light penetration region of a casing.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a display device, utilizing a light source of a backlight module to provide additional lighting effects at a light penetration region of a front panel.

Other objectives and advantages of the invention may be further illustrated by the technical features broadly embodied and described as follows.

In order to achieve one or a portion of or all of the objects or other objects, an embodiment of the invention provides a display device including a casing, a display panel, a backlight module, a front panel and a cover. The casing has a containing space. The display panel is disposed in the containing space. The backlight module is disposed in the containing space and includes a light guide plate and a light source. The light guide plate has a light emitting surface, a bottom surface, and a light incident surface connecting the light emitting surface and the bottom surface. The light emitting surface faces the display panel. The light source is disposed at the light incident surface and is suitable for providing a first light beam and a second light beam. The first light beam enters the light guide plate from the light incident surface and is illuminated towards the display panel from the light emitting surface after being transmitted in the light guide plate. The front panel is disposed at the casing and covers the containing space. The front panel has a light penetration region. The cover is disposed in the containing space and wraps the light source. The cover has at least one slot. The second light beam passes through the slot to be transmitted towards the light penetration region and is illuminated out of the containing space from the light penetration region.

In an embodiment of the invention, a transmission path of the second light beam does not pass through the light guide plate.

In an embodiment of the invention, the cover has a top side, the top side faces the front panel, and the slot is formed at the top side.

In an embodiment of the invention, the cover has a front side and a back side opposite to the front side, the front side faces the light guide plate, and the slot is formed at the back side.

In an embodiment of the invention, the cover has a top side and a bottom side opposite to the top side, an amount of the at least one slot is two, and the two slots are respectively formed at the top side and the bottom side.

In an embodiment of the invention, the front panel is a touch panel.

In an embodiment of the invention, the front panel has a display region, the display region is aligned to the display panel, and the light penetration region is located outside of the display region.

In an embodiment of the invention, the slot of the cover is aligned to the light penetration region of the front panel.

In an embodiment of the invention, the display device further includes a light guide component, wherein the light guide component has a light incident end and a light emitting end, the light incident end is aligned to the slot of the cover, the light emitting end is aligned to the light penetration region of the front panel, and the second light beam enters the light guide component from the light incident end and is illuminated towards the light penetration region from the light emitting end after being transmitted in the light guide component.

In an embodiment of the invention, the light guide component has a plurality of diffusing particles therein.

In an embodiment of the invention, the display device further includes a diffusing sheet, wherein the diffusing sheet is disposed at the light incident end of the light guide component.

In an embodiment of the invention, the display device further includes a color sheet, wherein the color sheet is disposed at the light incident end of the light guide component.

In an embodiment of the invention, the display device further includes a diffusing sheet, wherein the diffusing sheet is disposed at the cover and covers the slot.

In an embodiment of the invention, the display device further includes a color sheet, wherein the color sheet is disposed at the cover and covers the slot.

The embodiments of the invention have at least one of the features below. In the embodiments of the invention, the cover used to wrap the light source of the backlight module includes the slot. Therefore, the light source of the backlight module not only provides the first light beam to the light guide plate to act as the light needed for the display panel to display images, but also provides the second light beam passing through the slot of the cover and transmitted to the light penetration region of the front panel, to provide the light needed for call alerts, exterior decorations, scene exhibition, virtual keys or other types of additional lighting effects at the front panel. Since the display device of the invention, utilizes the light source of the backlight module and not additionally equipped light emitting components to provide additional lighting effects, manufacturing costs and power consumption of the display device are saved, and poses an advantage for the light, thin, and narrow border design of a display device.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to." Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
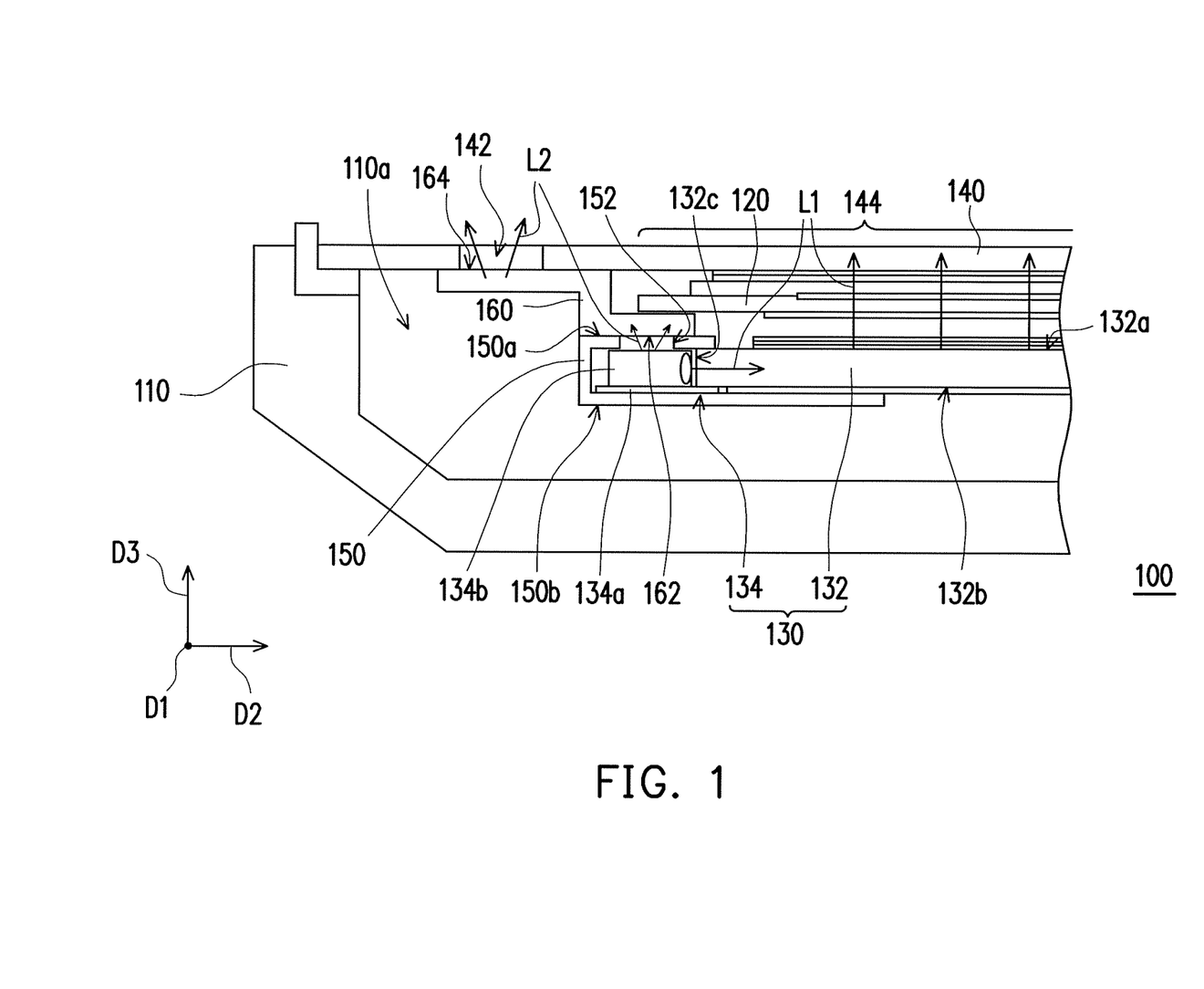
FIG. 1 is a schematic partial cross-sectional diagram illustrating a display device according to an embodiment of the invention.

FIG. 1 is a schematic partial cross-sectional diagram illustrating a display device according to an embodiment of the invention. Referring to FIG. 1, the display device 100 of the embodiment, for example, may be a mobile display device, and in particular may be a smart phone or a tablet PC; the invention is not limited thereto. The display device 100 includes a casing 110, a display panel 120, a backlight module 130, a front panel 140 and a cover 150. The casing 110 has a containing space 110a. The display panel 120, the backlight module 130 and the cover 150 are disposed in the containing space 110a. The front panel 140 is disposed at the casing 110 and covers the containing space 110a. The display panel 120, for example, is an LCD display panel, and the front panel 140, for example, is a touch panel.

The backlight module 130 includes a light guide plate 132 and a light source 134. The light guide plate 132 has a light emitting surface 132a, a bottom surface 132b and a light incident surface 132c connecting the light emitting surface 132a and the bottom surface 132b. The light emitting surface 132a faces the display panel 120. The light source 134, for example, is an LED (light emitting diode) light bar and includes a substrate 134a and a plurality of LED components 134b (one is exemplarily illustrated in FIG. 1) disposed at the substrate 134a. Wherein the plurality of LED components 134b are arranged on the substrate 134a along a direction D1 parallel to the light incident surface 132c. The light source 134 is disposed at the light incident surface 132c of the light guide plate 132 and is suitable for providing a first light beam L1 and a second light beam L2. The front panel 140 has a light penetration region 142. The cover 150 wraps the light source 134 and has at least one slot 152 (one slot 152 is exemplarily illustrated in FIG. 1).

The first light beam L1 provided by the light source 134 enters the light guide plate 132 from the light incident surface 132c of the light guide plate 132, and is illuminated towards the display panel 120 from the light emitting surface 132a of the light guide plate 132 after being transmitted in the light guide plate 132, to provide the light needed by the display panel 120 when displaying images. The second light beam L2 provided by the light source 134 passes through the slot 152 of the cover 150 to be transmitted towards the light penetration region 142 of the front panel 140, and is illuminated out of the containing space 110a of the casing 110 from the light penetration region 142.

Based on the above arrangement method, the light source 134 of the backlight module 130 not only provides the first light beam L1 to the light guide plate 132 to act as the light needed for the display panel 120 to display images, but also provides the second light beam L2 passing through the slot 152 of the cover 150 and transmitted to the light penetration region 142 of the front panel 140, to provide the light needed for call alerts, exterior decorations, scene exhibition, virtual keys or other types of additional lighting effects at the front panel 140. Since the display device 100 utilizes the light source 134 of the backlight module 130 to provide additional lighting effects and not additionally equipped light emitting components to provide additional lighting effects, manufacturing costs and power consumption of the display device 100 are saved, and poses an advantage for the light, thin, and narrow border design of the display device 100.

In the embodiment, the front panel 140 has a display region 144, the display region 144 is aligned to the display panel 120, and the user could view images displayed by the display panel 120 through the display region 144. The light penetration region 142 of the front panel 140, for example, is a key symbol and is located outside of the display region 144, to accommodate the touch function of the front panel 140 to act as a virtual key. In other embodiments, the light penetration region 142 of the front panel 140 may be utilized to provide other types of additional lighting effects and not for a virtual key, the front panel 140 may be a protection panel without touch functionality, and the invention is not limited thereto.

The cover 150 of the embodiment has a top side 150a and a bottom side 150b opposite to the top side 150a, the top side 150a faces the front panel 140, and the slot 152 of the cover 150 is formed at the top side 150a. In FIG. 1, the slot 152 of the embodiment and the LED component 134b are located on a same plane, and the plane is constituted by a direction D2 and a direction D3, wherein the direction D2 is perpendicular to the light incident surface 132c, and the direction D3 is perpendicular to the light emitting surface 132a. In other embodiments, the slot 152 could be located between two LED components 134b along the direction D1, that is, the relative positions of the slot 152 and the LED component 134b are not limited in the invention. In addition, in other embodiments (not illustrated), the cover 150 may have a plurality of slots 152 arranged along the direction D1, and the location of the plurality of slots 152 can be adjusted as needed, wherein parts of the slots 152 and the LED component 134b are located on a same plane, and another parts of the slots 152 are located between two LED components 134b. In addition the display device 100 of the embodiment further includes a light guide component 160, wherein the material of the light guide component 160 is a light guide material, for example polycarbonate (PC), polymethyl methacrylate (PMMA), polystyrene (PS), polyethylene terephthalate (PET), silicon, optical fiber, and the invention is not limited thereto. The light guide component 160 has a light incident end 162 and a light emitting end 164, the light incident end 162 is aligned to the slot 152 of the cover 150, and the light emitting end 164 is aligned to the light penetration region 142 of the front panel 140, such that the second light beam L2 provided by the light source 134 is suitable to enter the light guide component 160 from the light incident end 162 of the light guide component 160, and be illuminated to the light penetration region 142 of the front panel 140 from the light emitting end 164 of the light guide component 160 after being transmitted in the light guide component 160, wherein the transmission path of the second light beam L2 does not pass through the light guide plate 132. The light guide component 160 of the embodiment, for example, has a plurality of diffusing particles therein, such that the second light beam L2 is illuminated out of the light emitting end 164 more uniformly after passing through the light guide component 160. In addition, in other embodiments, the color of the second light beam L2 can be altered, through an arrangement of different colored diffusing particles, to further provide additional lighting effects of different colors.

In the embodiment, the light guide component 160, for example, is connected to the cover 150 and the front panel 140 by adhering. In other embodiments, the light guide component 160 could be fixed by other suitable means, and the invention is not limited thereto.

Figure 2:
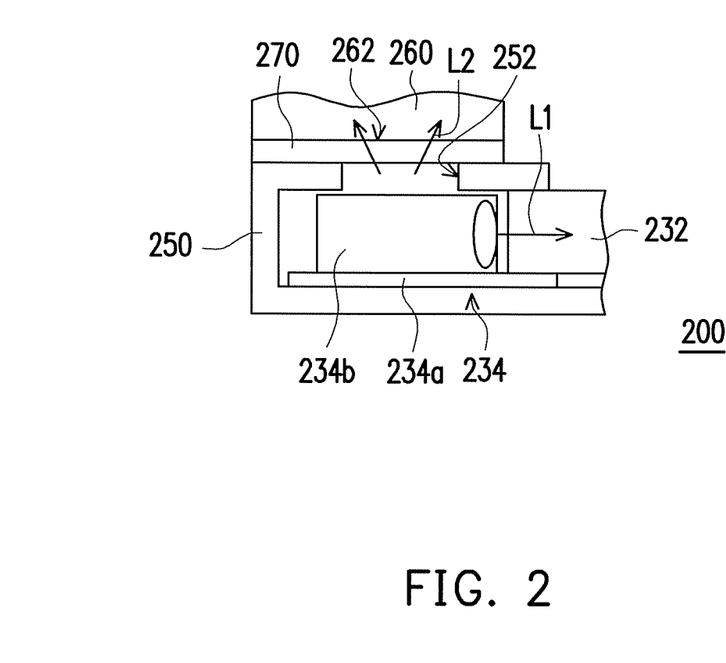
FIG. 2 is a schematic partial enlarged diagram illustrating a display device according to another embodiment of the invention.

FIG. 2 is a schematic partial enlarged diagram illustrating a display device according to another embodiment of the invention. The functions of the light guide plate 232, the light source 234, the substrate 234a, the LED component 234b, the cover 250, the light guide component 260, the first light beam L1 and the second light beam L2 of FIG. 2 are similar to the functions of the light guide plate 132, the light source 134, the substrate 134a, the LED component 134b, the cover 150, the light guide component 160, the first light beam L1 and the second light beam L2 of FIG. 1, and will not be repeated here. The difference between the embodiment of FIG. 2 and the embodiment of FIG. 1 lies in the display device 200 further includes a diffusing sheet 270, where the diffusing sheet 270 is disposed at the light incident end 262 of the light guide component 260 and faces the slot 252 of the cover 250, to further increase the uniformity of the second light beam L2 after being illuminated in to the light guide component 260. In other embodiments, the display device 200 could include a color sheet, where the color sheet is disposed at the light incident end 262 of the light guide component 260 similar to the diffusing sheet 270, to alter the color of the second light beam L2, and further provide additional lighting effects of different colors.

Figure 3:
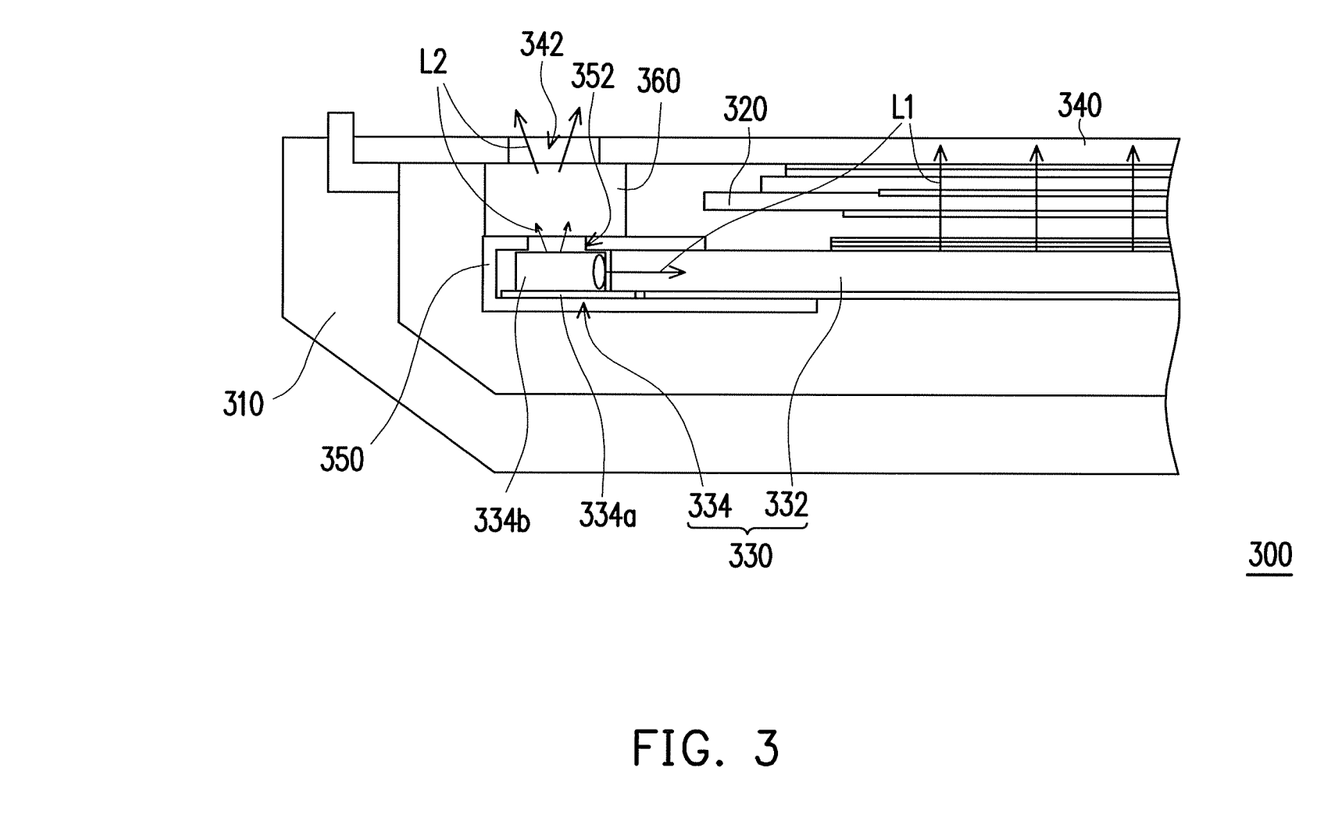
FIG. 3 is a schematic partial cross-sectional diagram illustrating a display device according to another embodiment of the invention.

FIG. 3 is a schematic partial cross-sectional diagram illustrating a display device according to another embodiment of the invention. In the display device 300 shown in FIG. 3, the functions of the casing 310, the display panel 320, the backlight module 330, the light guide plate 332, the light source 334, the substrate 334a, the LED component 334b, the front panel 340, the cover 350, the light guide component 360, the first light beam L1 and the second light beam L2 are similar to the functions of the casing 110, the display panel 120, the backlight module 130, the light guide plate 132, the light source 134, the substrate 134a, the LED component 134b, the front panel 140, the cover 150, the light guide component 160, the first light beam L1 and the second light beam L2 of FIG. 1, and will not be repeated here. The difference between the display device 300 and the display device 100 lies in, the slot 352 of the cover 350 is aligned to the light penetration region 342 of the front panel 340. Therefore, the light guide component 360 does not need to be extended to the light penetration region 142 of the front panel 140 from the slot 152 of the cover 150 in a bent manner as in FIG. 1, and thus simplifying the structure of the light guide component 360.

Figure 4:
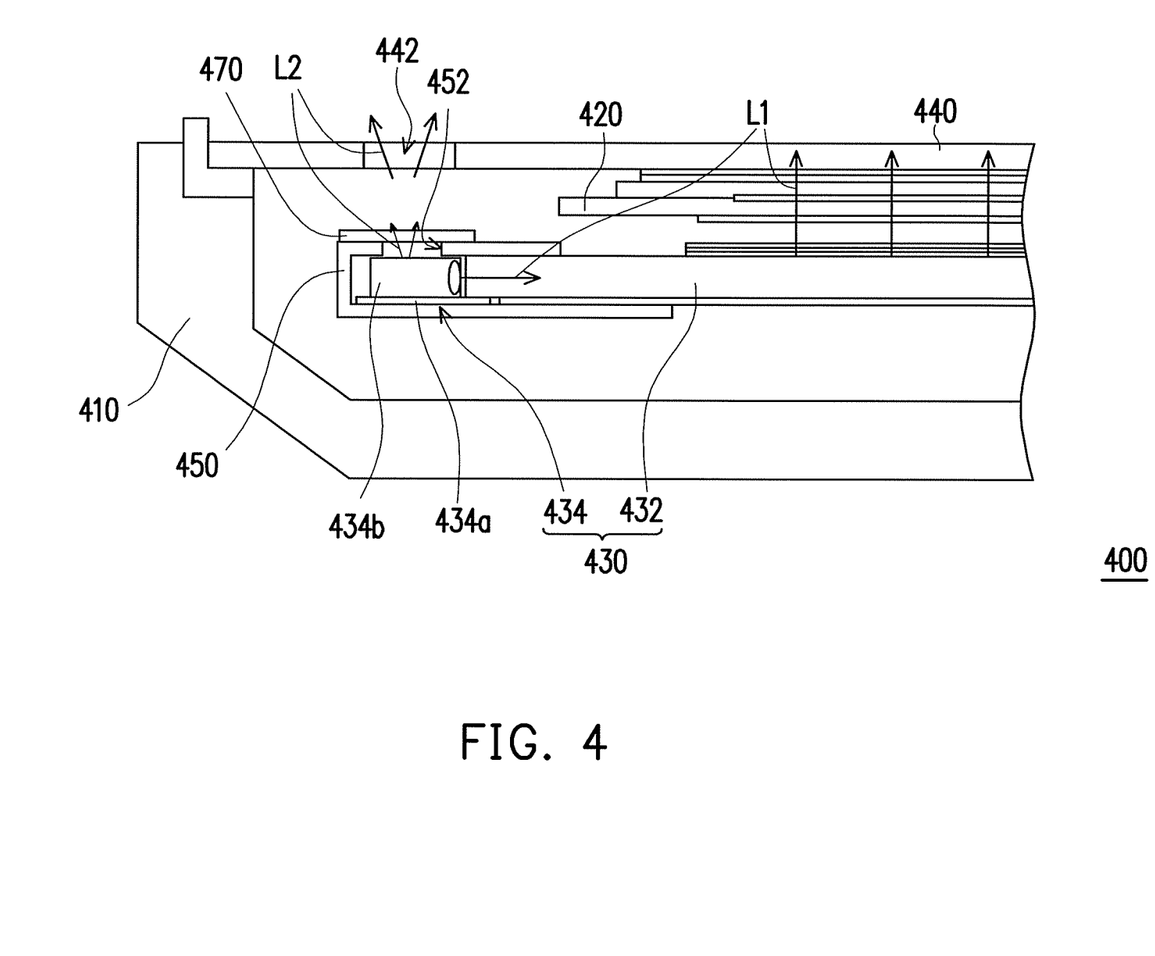
FIG. 4 is a schematic partial cross-sectional diagram illustrating a display device according to another embodiment of the invention.

FIG. 4 is a schematic partial cross-sectional diagram illustrating a display device according to another embodiment of the invention. In the display device 400 of FIG. 4, the functions of the casing 410, the display panel 420, the backlight module 430, the light guide plate 432, the light source 434, the substrate 434a, the LED component 434b, the front panel 440, the cover 450, the first light beam L1 and the second light beam L2 are similar to the functions of the casing 310, the display panel 320, the backlight module 330, the light guide plate 332, the light source 334, the substrate 334a, the LED component 334b, the front panel 340, the cover 350, the first light beam L1 and the second light beam L2 of FIG. 3, and will not be repeated here. The difference between the display device 400 and the display device 300 lies in, the display device 400 does not have the light guide component 360 of FIG. 3, but the display device 400 includes a diffusing sheet 470. The diffusing sheet 470, for example, is a transparent material or a semi-transparent material mixed with diffusing particles, the transparent material or the semi-transparent material, for example, is polycarbonate (PC), polymethyl methacrylate (PMMA), polystyrene (PS), polyethylene terephthalate (PET), silicon, the diffusing particles, for example, are PMMA particles, silicon diffusing particles, and the invention is not limited thereto. The diffusing sheet 470 is disposed at the cover 450 and covers the slot 452, the second light beam L2 is transmitted towards the light penetration region 442 of the front panel 440 after passing through the diffusing sheet 470, for increasing the uniformity of the second light beam L2 by the diffusing sheet 470. In addition, by using the diffusing sheet 470 to cover the slot 452, dust and other particles can be prevented from entering the cover 450 through the slot 452 and affecting the normal light emission of the light source 434. In other embodiments, the display device 400 could include a color sheet, where the color sheet is disposed at the cover 450 and covering the slot 452 similar to the diffusing sheet 470, to alter the color of the second light beam L2, further providing additional lighting effects with different colors.

Figure 5:
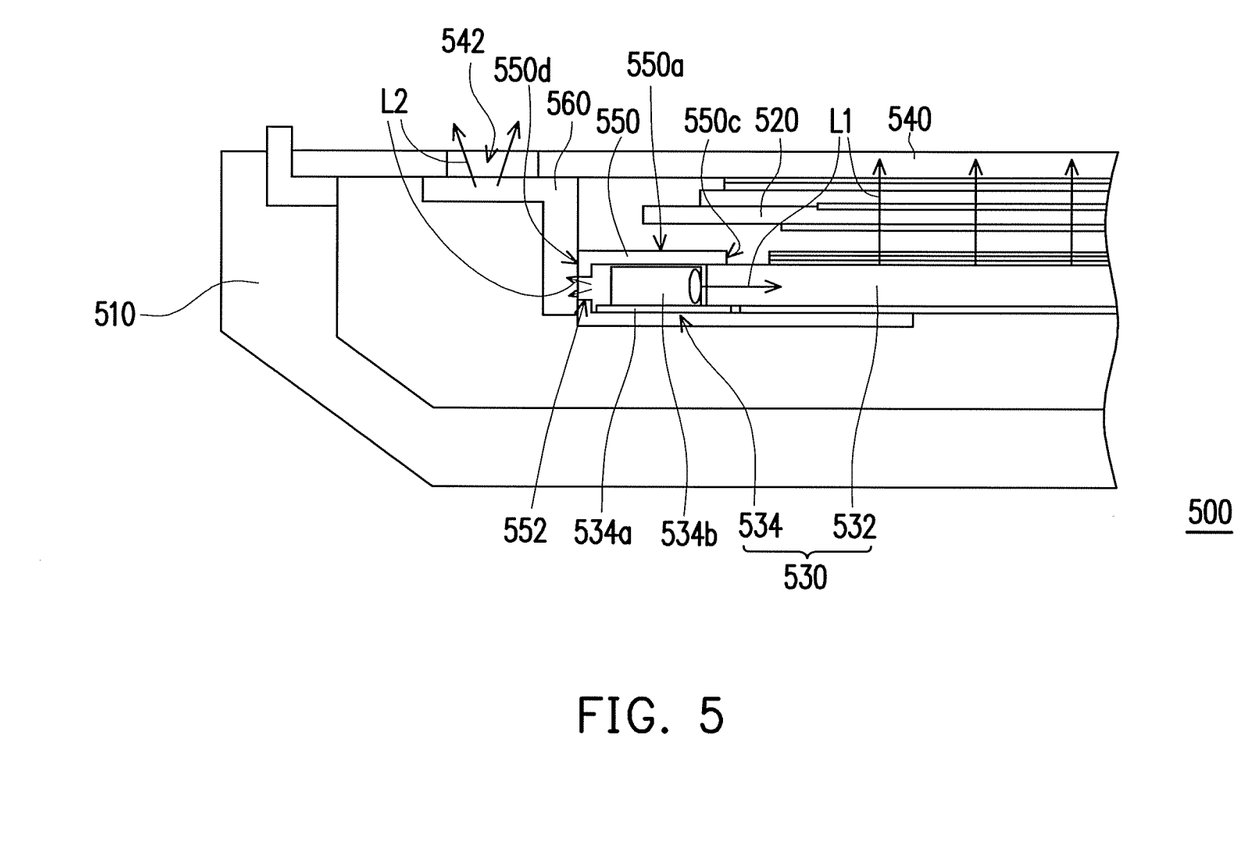
FIG. 5 is a schematic partial cross-sectional diagram illustrating a display device according to another embodiment of the invention.

FIG. 5 is a schematic partial cross-sectional diagram illustrating a display device according to another embodiment of the invention. In the display device 500 of FIG. 5, the functions of the casing 510, the display panel 520, the backlight module 530, the light guide plate 532, the light source 534, the substrate 534a, the LED component 534b, the front panel 540, the light guide component 560, the first light beam L1 and the second light beam L2 are similar to the functions of the casing 110, the display panel 120, the backlight module 130, the light guide plate 132, the light source 134, the substrate 134a, the LED component 134b, the front panel 140, the light guide component 160, the first light beam L1 and the second light beam L2 of FIG. 1, and will not be repeated here. The cover 550 of the embodiment has a front side 550c and a back side 550d opposite to the front side 550c, and the front side 550c faces the light guide plate 532. The difference between the display device 500 and the display device 100 lies in, the slot 552 is not formed at the top side 550a of the cover 550, but is formed at the back side 550d of the cover 550.

Figure 6:
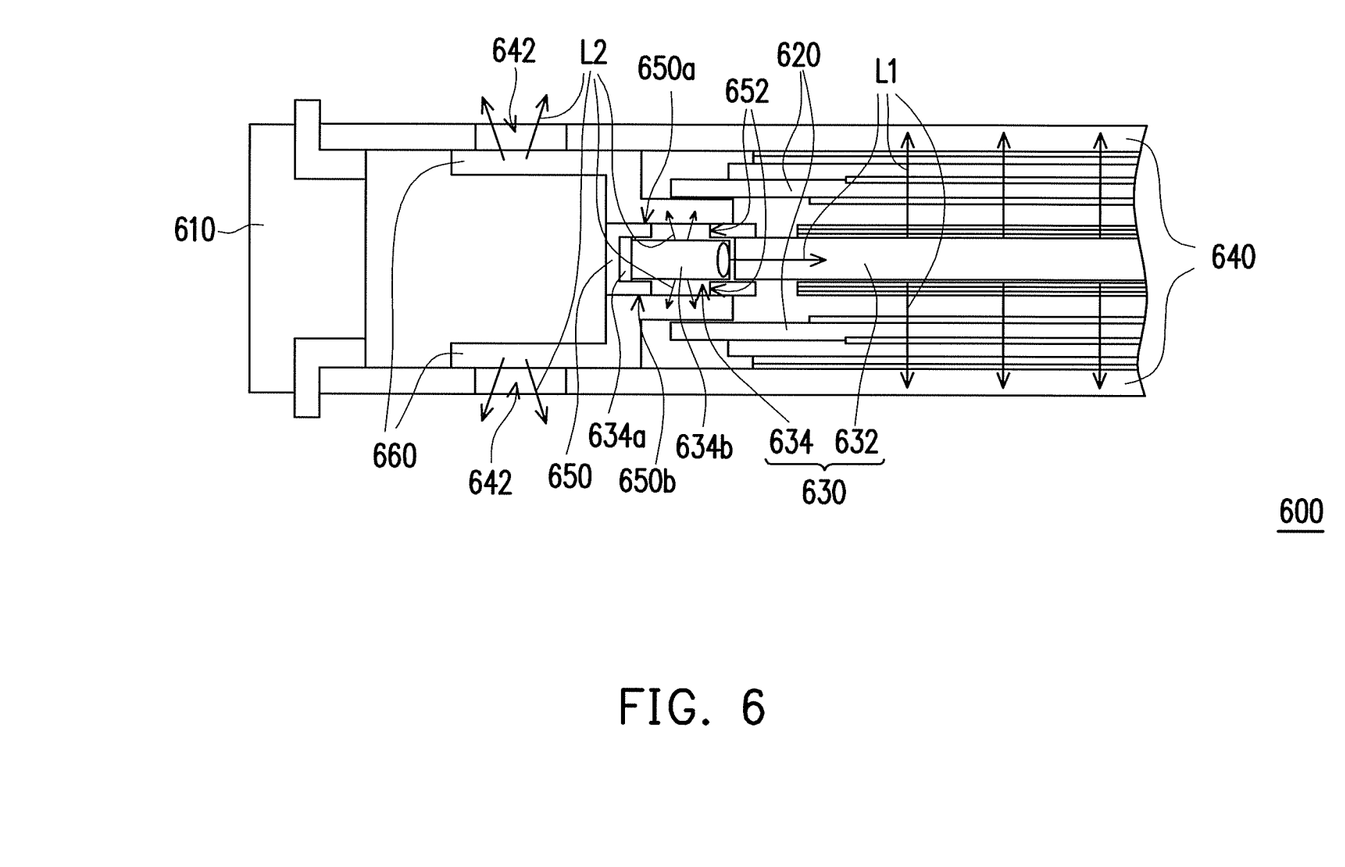
FIG. 6 is a schematic partial cross-sectional diagram illustrating a display device according to another embodiment of the invention.

FIG. 6 is a schematic partial cross-sectional diagram illustrating a display device according to another embodiment of the invention. In the display device 600 of FIG. 6, the functions of the casing 610, the display panel 620, the backlight module 630, the light guide plate 632, the light source 634, the substrate 634a, the LED component 634b, the front panel 640, the light guide component 660, the first light beam L1 and the second light beam L2 are similar to the functions of the casing 110, the display panel 120, the backlight module 130, the light guide plate 132, the light source 134, the substrate 134a, the LED component 134b, the front panel 140, the light guide component 160, the first light beam L1 and the second light beam L2 of FIG. 1, and will not be repeated here. The difference between the display device 600 and the display device 100 lies in, the display device 600 is a dual sided display device, and an amount of the display panels 620, the front panels 640 and the light guide components 660 thereof are all two and disposed symmetrically. Correspondingly, an amount of the slots 652 of the cover 650 is two, and the two slots 652 are respectively formed at the top side 650a and the bottom side 650b of the cover 650. A second light beam L2 provided by the light source 634 passes through one of the slots 652 and the corresponding light guide component 660 and is transmitted to the light penetration region 642 of the corresponding front panel 640, and another second light beam L2 provided by the light source 634 passes through another one of the slots 652 and the corresponding light guide component 660 and is transmitted to the light penetration region 642 of the corresponding front panel 640, and providing additional lighting effects to the dual sides of the display device 600 respectively.

The embodiments of the invention include at least one of the following advantages. In the embodiments of the invention, the cover used to wrap the light source of the backlight module includes the slot. Therefore, the light source of the backlight module not only provides the first light beam to the light guide plate to act as the light needed for the display panel to display images, but also provides the second light beam passing through the slot of the cover and transmitted to the light penetration region of the front panel, to provide the light needed for call alerts, exterior decorations, scene exhibition, virtual keys or other types of additional lighting effects at the front panel. Since the display device of the invention, utilizes the light source of the backlight module and not additionally equipped light emitting components to provide additional lighting effects, manufacturing costs and power consumption of the display device are saved, and poses an advantage for the light, thin, and narrow border design of a display device. In addition, the slot of the cover can be design to be aligned to the light penetration region of the front panel. Therefore, the light guide component does not need to be extended to the light penetration region of the front panel from the slot of the cover in a bent manner, and thus simplifying the structure of the light guide component.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first," "second," etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display device, comprising:
a casing, having a containing space;
a display panel, disposed in the containing space;
a backlight module, disposed in the containing space and comprising a light guide plate and a light source, wherein the light guide plate has a light emitting surface, a bottom surface and a light incident surface connecting the light emitting surface and the bottom surface, the light emitting surface faces the display panel, the light source is disposed at the light incident surface and suitable for providing a first light beam and a second light beam, and the first light beam enters the light guide plate from the light incident surface and is illuminated towards the display panel from the light emitting surface after being transmitted in the light guide plate;
a front panel, disposed at the casing and covers the containing space, wherein the front panel has a light penetration region; and
a cover, disposed in the containing space and wrapping the light source, wherein the cover has a top side, a bottom side opposite to the top side, a back side connected to the top side and the bottom side, a front side opposite to the back side, the front side faces the light guide plate, and at least one slot formed at the back side, the light source is not only between the top side and the bottom side, but also between the light guide plate and the back side, and the second light beam passes through the at least one slot to be transmitted towards the light penetration region and is illuminated out of the containing space from the light penetration region.

2. The display device as claimed in claim 1, wherein a transmission path of the second light beam does not pass through the light guide plate.

3. The display device as claimed in claim 1, wherein the front panel is a touch panel.

4. The display device as claimed in claim 1, wherein the front panel has a display region, the display region is aligned to the display panel, and the light penetration region is located outside of the display region.

5. The display device as claimed in claim 1, wherein the slot of the cover is aligned to the light penetration region of the front panel.

6. The display device as claimed in claim 1, further comprising a light guide component, wherein the light guide component has a light incident end and a light emitting end, the light incident end is aligned to the slot of the cover, the light emitting end is aligned to the light penetration region of the front panel, and the second light beam enters the light guide component from the light incident end and is illuminated towards the light penetration region from the light emitting end after being transmitted in the light guide component.

7. The display device as claimed in claim 6, wherein the light guide component has a plurality of diffusing particles therein.

8. The display device as claimed in claim 6, further comprising a diffusing sheet, wherein the diffusing sheet is disposed at the light incident end of the light guide component.

9. The display device as claimed in claim 6, further comprising a color sheet, wherein the color sheet is disposed at the light incident end of the light guide component.

10. The display device as claimed in claim 1, further comprising a diffusing sheet, wherein the diffusing sheet is disposed at the cover and covers the slot.

11. The display device as claimed in claim 1, further comprising a color sheet, wherein the color sheet is disposed at the cover and covers the slot.

12. A display device, comprising:
a casing, having a containing space;
a display panel, disposed in the containing space;
a backlight module, disposed in the containing space and comprising a light guide plate and a light source, wherein the light guide plate has a light emitting surface, a bottom surface and a light incident surface connecting the light emitting surface and the bottom surface, the light emitting surface faces the display panel, the light source is disposed at the light incident surface and suitable for providing a first light beam and a second light beam, and the first light beam enters the light guide plate from the light incident surface and is illuminated towards the display panel from the light emitting surface after being transmitted in the light guide plate;
a front panel, disposed at the casing and covers the containing space, wherein the front panel has a light penetration region; and
a cover, disposed in the containing space and wrapping the light source, wherein the cover has a top side, a bottom side opposite to the top side, a back side connected to the top side and the bottom side, and two slots respectively formed at the top side and the bottom side, the light source is not only between the top side and the bottom side, but also between the light guide plate and the back side, and the second light beam passes through the two slots to be transmitted towards the light penetration region and is illuminated out of the containing space from the light penetration region.

* * * * *